3,322,551
REFRACTORY AND METHOD
Jan Bowman, Los Gatos, Calif., assignor to Kaiser Aluminum & Chemical Corporation, Oakland, Calif., a corporation of Delaware
No Drawing. Continuation of application Ser. No. 383,962, July 20, 1964. This application Aug. 29, 1966, Ser. No. 576,188
9 Claims. (Cl. 106—58)

This application is continuation of application S.N. 383,962, filed July 20, 1964, and now abandoned.

This invention concerns refractories, particularly carbonaceous bonded refractories, and methods of making them.

The past few years have seen increased use of refractories, for example shapes such as bricks, consisting essentially of refractory grain, for example basic or non-acid oxide refractory grain such as periclase, magnesite, chromite, dolomite, and the like, bonded together by cokeable, carbonaceous bonding agents nuch as tar or pitch. Although these so called tar bonded refractories are useful in many refractory structures, they have achieved particularly widespread use as linings for oxygen steel converters, for example converters used in the L-D or oxygen steel making process.

One characteristic which is highly desired in these refractories is that they resist erosion under the conditions obtaining in such oxygen converters. Thus, they must resist both physical and chemical attack by molten metal, solid scrap metal charged to the converter, slag, and the action of hot gases and fumes. Although tar bonded refractories satisfactory for such service have been developed, the industry is continually looking for further improvements in the erosion resistance of refractories.

It has now been found, according to this invention, that a refractory showing superior erosion resistance, particularly under conditions obtaining in an oxygen converter, is obtained when to a refractory mass or batch consisting essentially of refractory grain and, as bonding agent or binder, a cokeable carbonaceous substance, preferably a pitch having a softening point of at least 200° F., there is added from 0.5% to 1.5%, preferably about 1%, based on the total weight of the batch, of finely divided aluminum or finely divided magnenium.

The refractory grain used in refractories according to this invention can be any refractory grain. The grains most commonly used in the tar or pitch bonded refractories are the so-called non-acid or basic oxide materials such as periclase, magnesite, dolomite, and the like.

The cokeable carbonaceous bonding agent used in refractories according to this invention can be any of the various known pitches having softening points of at least 200° F. and preferably a softening point of at least 300° F. The pitch is used in an amount to provide a good bond, generally from 1% to 10% of the total batch weight, as is well known in the art.

The finely divided aluminum or magnesium used in this invention preferably substantially all passes a 65 mesh screen and can be more finely divided, for example substantially all passing a 100 mesh screen.

In making refractories according to the method of this invention, the batch is generally mixed at room temperature, the pitch in a preferred embodiment being added in pulverized or flake form with, if desired, the addition of a liquid organic solvent therefor. A preferred solvent is light oil, which as is well known, is recovered in the distillation of coal tar and has a typical boiling point range of from 110° to 210° C. The finely divided aluminum or magnesium is incorporated in the batch at the time of mixing the refractory grain and the carbonaceous bond. After mixing the batch, shapes can be formed from it, for example by pressing, or it can be shipped and used in granular form, e.g. to ram or tamp a monolithic structure in a furnace.

The following tests are presented as illustrative but not limiting examples of this invention. In each test bricks made from the batches described were used to line a miniature test oxygen converter having an outside diameter of 1.5 feet. A small scale oxygen steel making operation according to the L-D process was carried out in the vessel, a complete heat or cycle of operations taking about 15 minutes. After 8 heats, the refractory shapes were removed from the converter and measured to determine the extent of erosion, the amount of erosion being expressed as thirty-seconds of an inch decrease from the original thickness of the refractory lining.

Test A was conducted with a refractory mix, hereafter referred to as Mix X, consisting of 71 parts by weight of a deadburned magnesite exhibiting the following analysis: 81% MgO, 12% CaO, 5% $SiO_2$, the balance being impurities; and of graded sizing from passing ⅜" to retained on 100 mesh; and 24.8 parts of a periclase having over 98% MgO, the balance being impurities, and sized to pass a 100 mesh screen. To this refractory mix were added 3.5 parts pulverized pitch having a softening point of from 300° to 320° F. and 1.2 parts neutral oil. Neutral oil is a light oil from which all the napthalene has been removed. Hereafter this combination of high softening point pitch and neutral oil is referred to as Bond H. The batch was divided into several portions, of which specimen A-1 contained no metallic additive, while A-2 contained 1 part by weight magnesium powder passing a 100 mesh screen, A-3 1 part pulverized aluminum, and A-4 2 parts by weight pulverized aluminum, these parts of metal being based on the total weight of the aforementioned proportions of refractory and bond. After mixing, each batch was pressed into bricks which had densities of about 181 lb./ft.³. After testing in the miniature oxygen steel converter these speciments showed erosions as indicated in Table I. (Specimens with the same letter designation were subjected to erosion testing at the same time.)

Test B was made with a composition having the same proportions of Mix X and Bond H as in Test A, Specimen B-1 having no metallic additive and B-2 having incorporated therein 1 part aluminum passing a 100 mesh screen. Again the erosion results are given in Table I.

TABLE I

| Specimen | Refractory Mix | Bond | Addition | | Erosion (in 1/32") | Effect |
|---|---|---|---|---|---|---|
| | | | Type | Amount | | |
| A-1 | X | H | | | 28 | |
| A-2 | X | H | Mg | 1 | 22 | + |
| A-3 | X | H | Al | 1 | 18 | + |
| A-4 | X | H | Al | 2 | 21 | + |
| B-1 | X | H | | | 15 | |
| B-2 | X | H | Al | 1 | 12 | + |
| C-1 | X | H | | | 33 | |
| C-2 | X | H | Mg | 1 | 17 | + |
| C-3 | X | H | Al | 2 | 27 | + |
| D-1 | Y | L | | | 32 | |
| D-2 | Y | L | Al | 0.5 | 42 | − |
| D-3 | Y | L | Al | 1.0 | 37 | − |
| D-4 | Y | L | Al | 1.0 | 37 | − |
| D-5 | Y | L | Al | 1.5 | 34 | − |
| E-1 | Y | L | | | 49 | |
| E-2 | Y | L | Al | 0.5 | 51 | − |
| E-3 | Y | L | Al | 1.0 | 44 | + |
| E-4 | Y | L | Al | 1.0 | 49 | − |
| E-5 | Y | L | Al | 1.5 | 41 | + |
| F-1 | X | H | | | 7 | |
| F-2 | X | H | Al | 0.5 | 9 | − |
| F-3 | X | H | Al | 1.5 | 12 | − |
| F-4 | Y | L | | | 8 | |
| F-5 | Y | L | Al | 1.0 | 44 | − |
| G-1 | X | H | | | 12 | |
| G-2 | X | H | Al | 0.5 | 9 | + |
| G-3 | X | H | Al | 1.0 | 8 | + |
| G-4 | X | H | Mg | 0.5 | 15 | − |
| G-5 | X | H | Mg | 1.0 | 18 | − |
| G-6 | X | H | Mg | 1.5 | 13 | − |
| H-1 | X | H | | | 9 | |
| H-2 | X | H | Al | 1.0 | 2 | + |
| J-1 | X | L | | | 17 | |
| J-2 | X | L | Al | 1.0 | 25 | − |

Test C was carried out with a composition containing 95.8 parts of Mix X, Specimen C-1 having 4.2 parts Bond H, while in C-2 and C-3 there were incorporated 4.7 parts of Bond H, C-2 having an addition of 1 part by weight magnesium and C-3 having an addition of 1 part aluminum, both metals passing a 100 mesh screen.

Test D was carried out to test the effect of metallic additions on a tar bond of lower softening point. The refractory aggregate was 65% deadburned dolomite showing an analysis of 59.1% CaO, 39.8% MgO, 0.7% $SiO_2$, 0.1% $Al_2O_3$, and 0.3% $Fe_2O_3$, and all passing a ⅜″ screen and retained on a 35 mesh screen; and 35% periclase of the following chemical analysis, on the ignited basis: 92.9% MgO, 5.5% $SiO_2$, 1.0% CaO, 0.4% $Fe_2O_3$, 0.2% $Al_2O_3$, all passing a 100 mesh screen. Hereafter, this refractory aggregate is referred to as Mix Y. The tar bond was 5.5 parts of a pitch having a softening point of 160° F., hereafter referred to as Bond L. Specimens were formed from the batch by vibration pressing at 230° F., that is to say at a temperature where the pitch was in liquid condition. Specimen D-1 contained no metallic additive while D-2, 3, 4 and 5 contained 0.5 part by weight —100 mesh aluminum, 1.0 part —100 mesh aluminum, 1.0 part —325 mesh aluminum, and 1.5 parts —100 mesh aluminum, respectively.

Test E was a complete duplicate of Test D, using the same materials and amounts of metallic additive for correspondingly numbered specimens.

In Test F, F-1 was made up of 95.8 parts Mix X with 4.2 parts of Bond H, while F-2, and F-3 contained in addition 0.5 part and 1.5 parts by weight, respectively, of aluminum passing a 100 mesh screen. Specimens F-4 and F-5 were made with 94.3 parts of Mix Y and 5.7 parts of Bond L, both specimens being precoked before insertion in the miniature oxygen test converter. Specimen F-5 contained 1 part finely divided aluminum while F-4 had no metal addition.

Test G was carried out with 95.8 parts Mix X and 4.2 parts of Bond H, Specimen G-1 containing no metallic additive and Specimens G-2 through G-6 containing 0.5 part aluminum, 1.0 part aluminum, 0.5 part magnesium, 1.0 part magnesium, and 1.5 parts magnesium, respectively, all the metallic additions being powders passing a 100 mesh screen.

Test H was carried out with 95.8 parts Mix X and 4.7 parts Bond H, H-1 containing no metallic additive and H-2 containing 1 part finely divided aluminum.

In Test J, 5 parts Bond L were combined with 95 parts of Mix X, Specimen J-1 having no metallic additive and J-2 having 1 part finely divided aluminum. The results of the erosion test (Table I) demonstrate that the essential factor is the type of pitch, and not the type of refractory grain, used in combination with the finely divided metal.

It will be understood that the miniature oxygen converter erosion test is a semi-quantitative test and the results are best interpreted on a broad or statistical basis rather than by means of precise numerical comparisons. To this end, there is indicated in the last column of Table I whether or not the metalic additive resulted in improved erosion resistance, or in no improvement, a plus sign indicating an improved erosion resistance and a minus sign no improvement.

It will also be understood that, because of variations from test to test in the erosion furnace, direct comparisons can be made only between specimens which were tested at the same time, that is to say between specimens with the same letter designation.

From the results tabulated in Table I, it can be concluded that in certain cases metallic additives had the effect of improving erosion resistance, while in other cases they had no such effect. To illustrate these conclusions more graphically, there is shown in Table II, as a function of the type of tar or pitch used and of the amount and type of metallic additive, the number of plus and minus signs recorded in Table I.

TABLE II

| High Softening Point Pitch (above 200° F.) | | | | |
|---|---|---|---|---|
| Additive (Type ↓) | (Amount→) | 0.5 | 1.0 | 1.5 | 2.0 |
| Al | | +− | +++++ | − | ++ |
| Mg | | − | ++− | | |

| Low Softening Point Pitch (below 200° F.) | | | |
|---|---|---|---|
| Additive (Type ↓) | (Amount→) | 0.5 | 1.0 | 1.5 |
| Al | | −− | +−−−−− | +− |

From Table II it can be seen that in each of five tests the 1 part addition of aluminum to a batch containing high softening point pitch as shown resulted in improved erosion resistance. Also, it can be seen that in 2 out of 3 tests with 1 part addition to the high softening point pitch of magnesium, there was improvement in the erosion resistance. On the other hand, in only 2 out of 10 tests where metallic additions were made to a low softening point pitch was there any improvement. From these results it is concluded that the addition to a high melting point pitch bond, i.e., a pitch bond with a softening point of above 200° F., of from 0.5% to 1.5%, particularly about 1%, based on the total weight of the refractory batch, of finely divided magnesium or, preferably, aluminum, results in increased erosion resistance, especially under conditions obtaining in an oxygen converter.

Besides its effect on erosion resistance, aluminum added to a tar bond also increases the strength of shapes with such bond after coking. For example, bricks made of Mix X and Bond H as in Test A and with 0, 1.0, and 2.0% additions of finely divided aluminum were coked by heating out of contact with air at 1000° C. for 2 hours and then tested for modulus of rupture. The brick with no addition had a strength of about 900 p.s.i., while that with 1% Al showed 1854 p.s.i. and that with 2% Al showed 1413 p.s.i. Besides the superiority of strength with metal additions, this test demonstrates the superiority of the 1% addition compared to a larger addition (2%).

In the specification and claims, percentages and parts are by weight unless otherwise indicated. Mesh sizes referred to herein are Tyler standard screen sizes which are defined in Chemical Engineers' Handbook, John H. Perry, editor-in-chief, third edition, 1950, published by McGraw-Hill Book Company, at Page 963. For example, a size passing a 100 mesh screen corresponds to 147 microns or 0.0058 inch. Where reference is made to a —100 mesh material, for example, it is meant that the material passes a 100 mesh screen. Analyses of mineral components are reported in the usual manner, expressed as simple oxides, e.g., MgO, $SiO_2$, although the components may actually be present in various combinations, e.g., as a magnesium silicate.

Having now described the invention, what is claimed is:

1. A method of increasing the resistance to erosion in an oxygen converter of refractories consisting essentially of non-acid refractory grains bonded by a pitch with a softening point of at least 200° F., said method comprising incorporating in the refractory batch from which said refractories are made from 0.5% to 1.5% by weight of the refractory batch of at least one element chosen from the group consisting of finely divided aluminum and finely divided magnesium.

2. A method according to claim 1 wherein said chosen material is finely divided aluminum.

3. A method according to claim 1 wherein said material incorporated is finely divided aluminum passing a 65 mesh screen and in an amount of 1% by weight of the refractory batch.

4. A method according to claim 3 wherein said aluminum substantially all passes a 100 mesh screen.

5. A refractory batch consisting essentially of non-acid refractory grains, a bonding amount of pitch having a softening point of at least 200° F., and from 0.5% to 1.5% by weight of the total batch of at least one element chosen from the group consisting of finely divided aluminum and finely divided magnesium.

6. A refractory batch according to claim 5 wherein said chosen material is finely divided aluminum passing a 65 mesh screen in an amount of 1% by weight of the total batch and said pitch has a softening point of from 300° F. to 320° F.

7. A batch according to claim 6 wherein said aluminum substantially all passes a 100 mesh screen.

8. A refractory shape resistant to erosion in an oxygen converter consisting essentially of sized basic refractory grains, a bonding amount of pitch having a softening point of at least 200° F., and from 0.5% to 1.5% of the total weight of the refractory of at least one element chosen from the group consisting of finely divided aluminum and finely divided magnesium.

9. A refractory shape according to claim 8 wherein said chosen material is finely divided aluminum passing a 65 mesh screen in an amount of 1% of the weight of the refractory.

References Cited

UNITED STATES PATENTS 2,013,625   9/1935   Buck _____ 106—56

FOREIGN PATENTS 690,859   4/1953   Great Britain.

TOBIAS E. LEVOW, *Primary Examiner.*

J. E. POER, *Assistant Examiner.*